United States Patent
Kou et al.

(10) Patent No.: US 11,795,343 B2
(45) Date of Patent: Oct. 24, 2023

(54) PROCESS FOR PREPARING UREA URETHANE POLYMER

(71) Applicant: BASF SE, Ludwigshafen am Rhein (DE)

(72) Inventors: Huiguang Kou, Ludwigshafen (DE); Ulrich Tritschler, Ludwigshafen (DE); Wolfgang Peter, Ludwigshafen (DE); Clemens Auschra, Ludwigshafen (DE)

(73) Assignee: BASF SE

( * ) Notice: Subject to any disclaimer, the term of this patent is extended or adjusted under 35 U.S.C. 154(b) by 431 days.

(21) Appl. No.: 16/762,745

(22) PCT Filed: Nov. 5, 2018

(86) PCT No.: PCT/EP2018/080189
§ 371 (c)(1),
(2) Date: May 8, 2020

(87) PCT Pub. No.: WO2019/096611
PCT Pub. Date: May 23, 2019

(65) Prior Publication Data
US 2021/0171797 A1    Jun. 10, 2021

(30) Foreign Application Priority Data

Nov. 14, 2017    (EP) .................................... 17201501

(51) Int. Cl.
| | |
|---|---|
| *C09D 175/12* | (2006.01) |
| *C09D 7/43* | (2018.01) |
| *C08G 18/10* | (2006.01) |
| *C08G 18/22* | (2006.01) |
| *C08G 18/28* | (2006.01) |
| *C08G 18/32* | (2006.01) |
| *C08G 18/76* | (2006.01) |
| *C08G 18/80* | (2006.01) |
| *C09D 5/02* | (2006.01) |
| *C09D 5/04* | (2006.01) |
| *C09D 175/04* | (2006.01) |

(52) U.S. Cl.
CPC .......... *C09D 175/12* (2013.01); *C08G 18/10* (2013.01); *C08G 18/225* (2013.01); *C08G 18/282* (2013.01); *C08G 18/283* (2013.01); *C08G 18/2835* (2013.01); *C08G 18/324* (2013.01); *C08G 18/3228* (2013.01); *C08G 18/3234* (2013.01); *C08G 18/7621* (2013.01); *C08G 18/8038* (2013.01); *C09D 5/024* (2013.01); *C09D 5/04* (2013.01); *C09D 7/43* (2018.01); *C09D 175/04* (2013.01)

(58) Field of Classification Search
CPC ........ C09D 175/12; C09D 5/024; C09D 5/04; C09D 7/43; C09D 175/04; C08G 18/10; C08G 18/225; C08G 18/282; C08G 18/2835; C08G 18/3228; C08G 18/3234; C08G 18/324; C08G 18/7621; C08G 18/8038; C08G 18/283
See application file for complete search history.

(56) References Cited

U.S. PATENT DOCUMENTS

| | | |
|---|---|---|
| 3,893,956 A | 7/1975 | Brandt |
| 4,314,924 A | 2/1982 | Haubennestel et al. |
| 4,383,068 A | 5/1983 | Brandt |
| 4,522,986 A | 6/1985 | Short et al. |
| 6,420,466 B1 | 7/2002 | Haubennestel et al. |
| 2004/0127674 A1* | 7/2004 | Haubennestel .......... C09D 5/04 528/65 |
| 2018/0170860 A1* | 6/2018 | Eberhardt ............. C07C 275/40 |

FOREIGN PATENT DOCUMENTS

| | | |
|---|---|---|
| EP | 0 006 252 A1 | 1/1980 |
| EP | 1 188 779 A1 | 3/2002 |

OTHER PUBLICATIONS

International Search Report dated Feb. 13, 2019 in PCT/EP2018/080189 filed Nov. 5, 2018.
Extended European Search Report dated May 11, 2018 in Patent Application No. 17201501.8, 3 pages.
International Preliminary Report on Patentability dated May 19, 2020 in PCT/EP2018/080189 filed Mar. 11, 2018, 7 pages.
Dr. H. Machemer, "Über die Guerbetsche Reaktion und ihre Technische Bedeutung", Angewandte Chemie, vol. 64, Issue 8, Apr. 21, 1952, pp. 213-220 (with English Abstract).

* cited by examiner

*Primary Examiner* — Rabon A Sergent
(74) *Attorney, Agent, or Firm* — Faegre Drinker Biddle & Reath LLP

(57) ABSTRACT

The presently claimed invention relates to a process for preparing urea urethane polymer, liquid compositions comprising the urea urethane polymer and the use of the urea urethane polymer as a thickening and thixotropic agent for water based and solvent based paint and coating formulations, lacquer, varnish, paper coating, wood coating, adhesive, ink, cosmetic formulation, detergent formulation, textile and drilling muds plaster formulations, PVC plastisol and cement formulations.

22 Claims, No Drawings

PROCESS FOR PREPARING UREA URETHANE POLYMER

The presently claimed invention relates to a process for preparing urea urethane polymer, liquid compositions comprising the urea urethane polymer and the use of the urea urethane polymer as a thixotropic agent for water based and solvent based paint and coating formulations, lacquer, varnish, paper coating, wood coating, adhesive, ink, cosmetic formulation, detergent formulation, textile and drilling muds plaster formulations, PVC plastisol and cement formulations.

BACKGROUND OF THE INVENTION

It is state of the art to use urea urethane polymers as rheology modifier additives in paints and coating formulations.

The urea urethane polymer is generally prepared by a two-step procedure wherein in the first step a monohydroxyl compound is reacted in the presence of diisocyanate to synthesize a monoisocyanate adduct; and in the second step the monoisocyanate adduct is reacted with diamine in the presence of a lithium salt and carrier solvent.

The method of action of the urea-urethanes to modify the rheology in a coating system involves the formation of reversible hydrogen bonds. Once the urea-urethane additive is mixed into the coating, the hydrogen bonds form between the additives and the coating forms a gel. Upon the addition of shear (mixing, shaking, etc.) the hydrogen bonds break up and the coating becomes flowable. After the shear force is removed, the hydrogen bonds build up again and the coating forms a gel again.

Urea urethane rheology modifier additives are based upon a well-defined stochiochemistry. The isocyanate group can react with any compound containing a reactive hydrogen. Reaction of an isocyanate with an alcohol yields a urethane. The reaction of an isocyanate with an amine yields a urea, and reaction of an isocyanate with water results in intermediates which decom-pose to yield carbon dioxide and an amine; which further reacts to again form a urea. Other potential isocyanate coreactants include carboxylic acids, urethanes and ureas. In order to prepare polymeric materials, the reaction partners must have at least two functional groups per molecule. The properties of urea urethane polymer depend on certain factors such as degree of branching and position of the functional groups of the reaction partners, content (ratios) of active groups and the physical state of raw materials.

Different approaches have been suggested in the prior art to obtain the urea urethane polymers.

U.S. Pat. Nos. 4,383,068 and 3,893,956 describe processes in which polyisocyanate adducts of mono-alcohols with diisocyanates and, where appropriate, diisocyanates are reacted with primary and/or secondary polyamines in the mandatory presence of binders to form urea adducts. These urea urethane polymers are prepared in a binder or carrier medium. These binders then have a rheology control property. The rheology control agents cannot be prepared on their own, without these carrier media, and consequently are of only limited usefulness.

U.S. Pat. No. 4,522,986 describes urethane-urea compounds which are prepared by reacting an NCO-terminated urethane prepolymer with an ethanol amine so as to form hydroxyurea-terminated rheology control agents. These NCO-terminated urethane prepolymers are obtained by reacting a polyether polyol with a stoichiometric excess of an aliphatic, cyclic polyisocyanate. The urethane-urea compounds are either isolated by concentration, as wax-like substances, or are isolated by dilution with acetone. The insoluble diurea compounds are isolated as crystalline substances, removed by filtration and discarded. A disadvantage associated with this process is that the stoichiometric excess of the diisocyanate is reacted with the alkanolamine, but must then be removed and discarded, since these ureas are insoluble in polymer solutions and would cause disruptions.

EP0 006 252 provides a process for preparing a thixotropic agent and describes urea urethanes that are prepared in aprotic solvents in the presence of lithium chloride by reacting isocyanate adducts with polyamines. The disadvantage of the products prepared in this way is the undefined structure of said urea urethanes due to the preparation process. The preparation process does not provide access to pure monoadducts, but instead forms mixtures of monoadducts and diisocyanates which react with diamines and lead to uncontrolled lengthening of the urea-urethane chain. In the process described, one mol of a diisocyanate is first reacted with one mol of a monoalcohol. This process partly produces the desired NCO-functional monoadducts, but also diadducts without any NCO-functionality. In addition, a proportion of the monomeric diisocyanate remains unreacted. The proportions of these different compounds may vary, depending on the accessibility of the NCO group and the reaction conditions applied, such as temperature and time. All these adducts prepared in this way contain fairly large amounts of unreacted diisocyanate that, during the further reaction with polyamines in the presence of lithium chloride, results in uncontrolled chain extension of the urea urethane and in polymeric ureas. These products then have a tendency to precipitation and can be kept in solution only with the greatest difficulty.

U.S. Pat. No. 6,420,466 describes a process for preparing a thixotropic agent which contains urea-urethanes wherein monohydroxyl compounds are reacted with an excess of toluene diisocyanate, whereby the unreacted portion of the toluene is removed from the reaction mixture and the monoisocyanate adduct obtained is further reacted with diarines in the presence of Lithium salts. The disadvantage of this process is that the subsequent removal of the stoichiometric excess of diisocyanate by vacuum distillation is a complex and expensive process. Also, because of the diurea-urethanes that are deliberately prepared, only a few active urea groups can be incorporated into the molecule and, consequently, the efficiency of these urea-urethanes is limited.

Despite the fact that urea urethane polymers are being commercially prepared and used for many years, there is still an ongoing need to provide a process for preparing urea urethane polymers which does not require a diisocyanate distillation step. It has been a challenge for the researchers to reduce the free diisocyanate in the first step such that the monoisocyanate adduct, i.e. without free diisocyanates, is formed which when reacts with the diamine in the second step results into a more definite structure of urea urethane polymer.

Thus, it was an object of the presently claimed invention to provide a process for preparing storage stable urea urethane polymers which do not require a diisocyanate distillation step thereby providing a simpler and more economical process, avoiding the disadvantages associated with the presence of free diisocyanate and providing a urea urethane polymer which upon use in paint and coating formulations imparts thickening effect and thixotropic properties to the formulations.

SUMMARY OF THE INVENTION

Surprisingly, it has been found that using an excess of monohydroxyl compound represented by general formula R—OH to diisocyanate, i.e. the molar ratio of the monohydroxyl compound to the toluene diisocyanate being in the range of ≥1.0:1 to: ≤1.5:1, leads to the formation of a urea urethane polymer without necessitating the step of distillation of the diisocyanate.

The inventors surprisingly found that in the process of preparing a urea urethane polymer, the monoisocyanate adduct obtained by reacting a monohydroxyl compound represented by R—OH and toluene diisocyanate in a molar ratio in the range of >1.0:1.0 to ≤1.5:1.0, when reacted with diamine in the presence of a polar aprotic solvent and lithium salt, provides a urea urethane polymer, without the step of distillation of the diisocyanate. The process provides a urea urethane polymer which is stable and which upon use as an additive in paint and coating formulations imparts thixotropic properties to the formulations. The urea urethane polymer according to the present invention is used as a thixotropic agent for paint and coating formulations, lacquer, varnish, paper coating, wood coating, adhesive, ink, cosmetic formulation, detergent formulation, textile and drilling muds plaster formulations, PVC plastisol and cement formulations.

In the following, specific embodiments of the present invention are described:

1. In an embodiment, the presently claimed invention provides a process for preparing a urea urethane comprising:
   i) introducing toluene diisocyanate into a reactor;
   ii) adding at least one monohydroxyl compound of general formula (I)

R—OH                      (I), wherein R is linear or branched alkyl containing 4 to 22 carbon atoms, linear or branched alkenyl containing 4 to 22 carbon atoms, cycloalkyl containing 6 to 12 carbon atoms, aralkyl containing 7 to 12 carbon atoms, a radical of formula $C_mH_{2m+1}(O-C_nH_{2n})_x-$, a radical of formula $H(O-C_nH_{2n})_x-$, a radical of formula $C_mH_{2m+1}[O-C(=O)-C_vH_{2v}]_x-$, or a radical of formula $C_mH_{2m+1}(O-C_nH_{2n})_{x-1}[O-C(=O)-C_vH_{2v}]_x-$, wherein m is an integer from 1 to 22, n is an integer from 2 to 4, x is an integer from 1 to 15 and v is an integer from 4 to 6,
   to obtain at least one monoisocyanate adduct;
   whereby the molar ratio of the at least one monohydroxyl compound of general formula (I) to the toluene diisocyanate is in the range of >1.0:1.0 to: ≤1.5:1.0;
   iii) preparing a pre-mix by mixing at least one diamine, at least one polar aprotic solvent, and at least one lithium salt; and
   iv) feeding the pre-mix obtained in step iii) into the reactor to react with the at least one monoisocyanate adduct obtained in step ii) to obtain the urea urethane.

2. The process according to embodiment 1, wherein the toluene diisocyanate is selected either from 2,4-toluene diisocyanate, or an isomeric mixture of 2,4-toluene diisocyanate and 2,6-toluene diisocyanate.

3. The process according to one or more of embodiment 2, wherein 2,4-toluene diisocyanate is present in the isomeric mixture in an amount in the range of ≥85.0 wt.-% to ≤99.9 wt.-%, related to the total weight of the isomeric mixture.

4. The process according to embodiment 2, wherein 2,4-toluene diisocyanate is present in the isomeric mixture in an amount in the range of ≥90.0 wt.-% to ≤99.9 wt.-%, related to the total weight of the isomeric mixture.

5. The process according to one or more of embodiments 1 to 4, wherein in general formula (I) m is an integer from 1 to 4.

6. The process according to one or more of embodiments 1 to 5, wherein in general formula (I) n is 2.

7. The process according to one or more of embodiments 1 to 6, wherein in general formula (I) x is an integer from 3 to 10.

8. The process according to one or more of embodiments 1 to 7, wherein the at least one monohydroxyl compound of general formula (I) is selected from the group consisting of butyltriglycol, methoxy polyethylene glycol, butanol, isotridecyl alcohol, oleyl alcohol, Guerbet alcohols containing 8 to 20 carbon atoms, linoleyl alcohol, lauryl alcohol, stearyl alcohol, cyclohexanol and benzyl alcohol.

9. The process according to one or more of embodiments 1 to 8, wherein the at least one monohydroxyl compound of general formula (I) is selected from the group consisting of butyltriglycol, 2-ethylhexanol and methoxy polyethylene glycol.

10. The process according to one or more of embodiments 1 to 9, wherein the molar ratio of the at least one monohydroxyl compound of general formula (I) to the toluene diisocyanate is in the range of ≥1.05:1.0 to ≤1.2:1.0.

11. The process according to one or more of embodiments 1 to 10, wherein the at least one monohydroxyl compound of general formula (I) in step (ii) is added during a time period in the range of ≥3 hours to ≤50 hours.

12. The process according to one or more of embodiments 1 to 11, wherein the at least one monohydroxyl compound of general formula (I) in step (ii) is added during a time period in the range of ≥3 hours to ≤30 hours.

13. The process according to one or more of embodiments 1 to 12, wherein the at least one monohydroxyl compound of general formula (I) in step (ii) is added during a time period in the range of ≥3 hours to ≤20 hours.

14. The process according to one or more of embodiments 1 to 13, wherein in step ii) the temperature is in the range of ≥20° C. to ≤60° C.

15. The process according to one or more of embodiments 1 to 14, wherein in step ii) the temperature is in the range of ≥25° C. to ≤55° C.

16. The process according to one or more of embodiments 1 to 15, wherein in step ii) the temperature is in the range of ≥30° C. to ≤50° C.

17. The process according to one or more of embodiments 1 to 16, wherein in step (ii) a solvent is added.

18. The process according to embodiment 17, wherein the solvent is selected from the group consisting of acetone, benzene, ethyl acetate, butyl acetate, diethylether, carbon tetrachloride and chlorobenzene.

19. The process according to one or more of embodiments 17 or 18, wherein the weight ratio of toluene diisocyanate to the solvent is in the range of ≥0.5:1 to ≤5:1.

20. The process according to one or more of embodiments 17 to 19, wherein the weight ratio of toluene diisocyanate to the solvent is in the range of ≥1:1 to ≤3:1.

21. The process according to one or more of embodiments 1 to 20, wherein the at least one diamine is selected from the group consisting of amines of general formula (II),

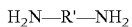   (II)

wherein R' is —$C_yH_{2y}$, and y is an integer from 2 to 12,

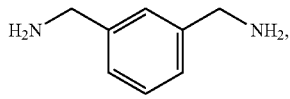

amines of general formula (III),

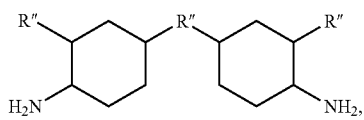   (III)

amines of general formula (IV), and

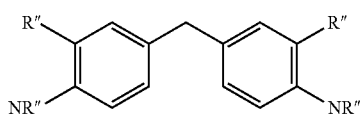   (IV)

amines of general formula (V),

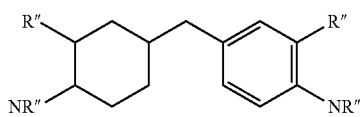   (V)

wherein R″, identical or different, is $CH_3$— or H.

22. The process according to one or more of embodiments 1 to 21, wherein the at least one diamine is selected from the group consisting of 4,4-diamino-diphenylmethane, 3,3-di-methyl-4,4-diamino-diphenylmethane, 2,2-bis(4-aminocyclohexyl)-propane, N,N-dimethyl-4,4-diamino-diphenylmethane, (3-methyl-4-aminocylcohexyl)-(3-methyl-4-aminophenyl)-methane, isomeric xylylenediamine, ethylenediamine, hexamethylenediamine, 4,4-methylenebis(cyclohexylamine) and 1,12-diaminododecane.

23. The process according to one or more of embodiments 1 to 22, wherein the at least one polar aprotic solvent is selected from the group consisting of dimethyl sulfoxide, N,N-dimethylformamide, N,N-dimethylacetamide, N-methylpyrrolidone, N-ethylpyrrolidone, N-propylpyrrolidone, N-butylpyrrolidone, N,N,N',N'-tetramethylurea, and hexamethyl-phosphoric acid triamide.

24. The process according to one or more of embodiments 1 to 23, wherein the lithium salt is selected from the group consisting of lithium chloride, lithium nitrate and lithium bromide.

25. The process according to one or more of embodiments 1 to 24, wherein the lithium salt is present in the range of ≥0.3 to ≤1.5 mol, relative to the equivalent weight of the at least one diamine.

26. The process according to one or more of embodiments 1 to 25, wherein in step iv) the temperature is in the range of ≥30° C. to ≤100° C.

27. The process according to one or more of embodiments 1 to 26, wherein in step iv) the temperature is in the range of ≥40° C. to ≤80° C.

28. The process according to one or more of embodiments 1 to 27, wherein in step iv) the temperature is in the range of ≥40° C. to ≤60° C.

29. The process according to one or more of embodiments 1 to 28, wherein the solvent added in step ii) is removed at the end of step iv).

30. The process according to one or more of embodiments 1 to 29, wherein the urea urethane obtained has a weight average molecular weight in the range of ≥500 g/mol to ≤3000 g/mol determined according to DIN 55672-1.

31. A liquid composition comprising ≥0.01 wt.-% to ≤10.0 wt.-%, based on the total weight of the liquid composition, of the urea urethane obtained according to the process of one or more of claims 1 to 30; and ≥15.0 wt.-% to 99.9≤wt.-%, based on the total weight of the liquid composition of at least one of the components, selected from the group consisting of pigment pastes, binders, fillers, solvents, defoamers, neutralising agent, wetting agent, pigment dispersing agents, preservatives and water.

32. The liquid composition according to embodiment 31, wherein the composition is a paint, water based coating formulations, solvent based coating formulations, lacquer, varnish, paper coating, wood coating, adhesive, ink, cosmetic formulation, detergent formulation, textile, and drilling muds plaster formulations, cement compositions, formulations for plasterboard, for hydraulic binders such as mortar formulations, formulations for ceramics and for leather.

33. Use of the urea urethane obtained according to the process of one or more of embodiments 1 to 32 in liquid compositions as a thixotropic agent for paint and coating formulations, adhesive, paint lacquer, PVC plastisol, ink and cement formulations.

DETAILED DESCRIPTION OF THE INVENTION

Before the present process of the invention and various embodiments are described in detail, it is to be understood that this invention is not limited to particular process described, since such processes may, of course, vary. It is also to be understood that the terminology used herein is not intended to be limiting, since the scope of the present invention will be limited only by the appended claims.

If hereinafter a group is defined to comprise at least a certain number of embodiments, this is meant to also encompass a group which preferably consists of these embodiments only. In case the terms "first", "second", "third" or "i)", "ii)", "iii)", or "(A)", "(B)" and "(C)" or "(a)", "(b)", "(c)", "(d)", etc. relate to steps of a method or use or assay there is no time or time interval coherence between the steps, that is, the steps may be carried out simultaneously or there may be time intervals of seconds, minutes, hours, days, weeks or even months between such steps, unless otherwise indicated in the application as set forth herein above or below.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

The presently claimed invention is directed to a process for preparing a urea urethane polymer which is used as an additive in solvent-containing, solvent free and water based paint and coating formulations, for imparting the thixotropic properties to said formulations thereby enabling the use of urea urethane polymer obtained by the process of the presently claimed invention to modify the rheological profile of paint and coating formulations, lacquer, varnish, paper coating, wood coating, adhesive, ink, cosmetic formulations, detergent formulations, textile and drilling muds plaster formulations, PVC plastisol and cement formulations.

The present invention provides a process for preparing urea urethane polymer comprising: i) introducing toluene diisocyanate into a reactor; ii) adding at least one monohydroxyl compound of general formula (I) R—OH, wherein R is linear or branched alkyl containing 4 to 22 carbon atoms, linear or branched alkenyl containing 4 to 22 carbon atoms, cycloalkyl containing 6 to 12 carbon atoms, aralkyl containing 7 to 12 carbon atoms, a radical of formula $C_mH_{2m+1}(O-C_nH_{2n})_x-$, a radical of formula $H(O-C_nH_{2n})_x-$, a radical of formula $C_mH_{2m+1}[O-C(=O)-C_vH_{2v}]_x-$, or a radical of formula $C_mH_{2m+1}(O-C_nH_{2n})_{x-1}[O-C(=O)-C_vH_{2v}]_x-$, wherein m is an integer from 1 to 22, n is an integer from 2 to 4, x is an integer from 1 to 15 and v is an integer from 4 to 6, to obtain at least one monoisocyanate adduct; whereby the molar ratio of the at least one monohydroxyl compound of general formula (I) to the toluene diisocyanate is in the range of $\geq 1.0:1$ to $\leq 1.5:1$; iii) preparing a pre-mix by mixing at least one diamine, at least one polar aprotic solvent, and at least one lithium salt; and iv) feeding the pre-mix obtained in step into the reactor to react with the at least one monoisocyanate adduct obtained in step ii) to obtain the urea urethane.

The term "thixotropic effect" as used herein means a property exhibited by a viscous or a gel like product turning more liquid as it is deformed for longer time and more rigorously (e.g. by stirring).

The term "alkyl", as used herein, refers to an acylic saturated aliphatic groups that is solely constituted of carbon atoms and hydrogen atoms, including linear or branched alkyl residues. Furthermore, the alkyl residue is preferably unsubstituted.

The term "alkenyl", as used herein, refers to acyclic unsaturated hydrocarbon residues, including linear or branched alkenyl residues, and comprise at least one double bond, preferably 1, 2, or 3 double bonds. Furthermore, the alkenyl residue is preferably unsubstituted. Representative examples of alkenyl include, but are not limited to, 1-hexenyl, 2-hexenyl, 1-heptenyl, 2-heptenyl, 1-octenyl, 2-octenyl, 1-nonenyl, 2-nonenyl, 1-decenyl, 2-decenyl, 1-undecenyl, 2-undecenyl, 1-dodecenyl, 2-dodecenyl, 1-tridecenyl, 2-tridecenyl, 1-tetradecenyl, 2-tetradecenyl, 1-pentadecenyl, 2-pentadecenyl, 1-hexadecenyl, 2-hexadecenyl, 1-heptadecenyl, 2-heptadecenyl, 1-octadecenyl, 2-octadecenyl, 1-nonadecenyl, 2-nonadecenyl, 1-eicosenyl and 2-eicosenyl.

Within the context of the present invention and as used herein, the term "cycloalkyl" refers to a saturated cyclic hydrocarbon residue including 6, 7, 8, 9, 10, 11 or 12 atoms, as ring members. The cycloalkyl group is preferably unsubstituted.

As used herein, "branched" denotes a chain of atoms with one or more side chains attached to it. Branching occurs by the replacement of a substituent, e.g., a hydrogen atom, with a covalently bonded aliphatic moiety.

The term "aralkyl" refers to a radical derived from an alkyl radical by replacing one or more hydrogen atoms by an aryl group. Furthermore, the aralkyl residue is preferably unsubstituted. Representative examples of aralkyl include, but are not limited to, benzyl, o-tolyl, m-tolyl, p-tolyl, 2,3-, 2,4-, 2,5-, 2,6-, 3,4-, 3,5-xylyl and mesityl.

The term "aryl" refers to aromatic carbocyclic rings of 6 to 30 ring members, including both mono, bi-, and tri-cyclic ring systems. Non-limiting examples of aryl include indenyl, phenyl and naphthyl.

In context of the present invention the term "monoisocyanate adduct" refers to an addition product of monohydroxyl compound of general formula (I) and toluene diisocyanate. The monoisocyanate adduct has free reactive isocyanate groups which react with diamine.

The term "polar aprotic solvent" refers to a solvent made of polar molecules with a comparatively high relative permittivity (or dielectric constant), greater than 15, and a permanent dipole moment, that cannot donate suitably labile hydrogen atoms to form strong hydrogen bonds.

The term "theoretical NCO content" refers to the content of NCO which is theoretically calculated based on only half amount of the NCO groups from TDI raw material reacted with R—OH.

In an embodiment according to the presently claimed invention, in the monohydroxyl compound of general formula (I), R is a linear or a branched alkyl selected from the group consisting of n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl, n-docosyl, 2-ethylhexyl, 2-propyl-heptyl, 2-butyl-1-octyl, 2-pentyl-1-nonyl, isobutyl, isopentyl, isohexyl, isoheptyl, isooctyl, isodecyl, isoundecyl, isododecyl, isotridecyl, iso-tetradecyl, isopentadecyl, isohexadecyl, isoheptadecyl, isooctadecyl, isononadecyl, isoeicosyl, isoheneicosyl, and isodocosyl.

In an embodiment according to the presently claimed invention, in the monohydroxyl compound of general formula (I), R is a linear or a branched alkenyl selected from the group consisting 1-hexenyl, 2-hexenyl, 1-heptenyl, 2-heptenyl, 1-octenyl, 2-octenyl, 1-nonenyl, 2-nonenyl, 1-decenyl, 2-decenyl, 1-undecenyl, 2-undecenyl, 1-dodecenyl, 2-dodecenyl, 1-tridecenyl, 2-tridecenyl, 1-tetradecenyl, 2-tetradecenyl, 1-pentadecenyl, 2-pentadecenyl, 1-hexadecenyl, 2-hexadecenyl, 1-heptadecenyl, 2-heptadecenyl, 1-octadecenyl, 2-octadecenyl, 1-nonadecenyl, 2-nonadecenyl, 1-eicosenyl, 2-eicosenyl, cis-7-decenyl, cis-9-octadecenyl (oleyl), cis-8,11-heptadecadienyl, cis-9,12-octadecadienyl (linoleyl), cis-10,13-nonadecadienyl and cis-6,9,12-octadecatrienyl.

In an embodiment according to the presently claimed invention, in the monohydroxyl compound of general formula (I), R is a cycloalkyl selected from the group consisting of cyclohexyl, cyclo-heptyl, cyclooctyl, cyclononyl, cyclodecyl, cycloundecyl, and cyclododecyl.

In an embodiment according to the presently claimed invention, in the monohydroxyl compound of general formula (I), R is an aralkyl selected from the group consisting of benzyl, o-tolyl, m-tolyl, p-tolyl, 2,3-, 2,4-, 2,5-, 2,6-, 3,4-, 3,5-xylyl and mesityl.

In an embodiment according to the presently claimed invention, in the monohydroxyl compound of general formula (I), R is a radical of formula $C_mH_{2m+1}(O-C_nH_{2n})_x-$, wherein m is an integer from 1 to 22, n is an integer from 2 to 4, x is an integer from 1 to 15.

In an embodiment according to the presently claimed invention, in the monohydroxyl compound of general formula (I), R is a radical of formula $H(O-C_nH_{2n})_x-$, wherein m is an integer from 1 to 22, n is an integer from 2 to 4, x is an integer from 1 to 15.

In an embodiment according to the presently claimed invention, in the monohydroxyl compound of general formula (I), R is a radical of formula $C_mH_{2m+1}[O-C(=O)-C_vH_{2v}]_x-$, wherein m is an integer from 1 to 22, n is an integer from 2 to 4, x is an integer from 1 to 15 and v is an integer from 4 to 6.

In an embodiment according to the presently claimed invention, in the monohydroxyl compound of general formula (I), R is a radical of formula $C_mH_{2m+1}(O-C_nH_{2n})_{x-1}[O-C(=O)-C_vH_{2v}]_x-$, wherein m is an integer from 1 to 22, n is an integer from 2 to 4, x is an integer from 1 to 15 and v is an integer from 4 to 6.

In an embodiment according to the presently claimed invention, in general formula (I) m is an integer from 1 to 4.

In an embodiment according to the presently claimed invention, in general formula (I) n is 2.

In an embodiment according to the presently claimed invention, in general formula (I) x is an integer from 3 to 10.

In an embodiment according to the presently claimed invention, the molar ratio of the at least one monohydroxyl compound of general formula (I) to the toluene diisocyanate is in the range of >1.0:1.0 to ≤1.5:1.0, preferably in the range of ≥1.005:1.0 to ≤1.45:1.0, more preferably in the range of ≥1.01:1.0 to ≤1.4:1.0, even more preferably in the range of ≥1.025:1.0 to ≤1.35:1.0, further more preferably in the range of ≥1.050:1.0 to ≤1.3:1.0 or in the range of ≥1.075:1.0 to ≤1.25:1.0, most preferably in the range of ≥1.1:1.0 to ≤1.2:1.0 or ≥1.005:1.0 to ≤1.2:1.0.

In an embodiment according to the presently claimed invention, the toluene diisocyanate is selected from either 2,4-toluene diisocyanate or an isomeric mixture of 2,4-toluene diisocyanate and 2,6-toluene diisocyanate, preferably an isomeric mixture of 2,4-toluene diisocyanate and 2,6-toluene diisocyanate.

In an embodiment according to the presently claimed invention, the 2,4-toluene diisocyanate is present in the isomeric mixture in an amount in the range of ≥85.0 wt.-% to ≤99.9 wt.-%, related to the total weight of the isomeric mixture, preferably in the range of ≥90.0 wt.-% to ≤99.9 wt.-% of the 2,4-isomer, and most preferably in the range of ≥95.0 wt.-% to ≤99.9 wt.-% of the 2,4-isomer.

In an embodiment according to the presently claimed invention, the at least one monohydroxyl compound of general formula (I) is selected from the group consisting of butyltriglycol, methoxy polyethylene glycol, butanol, isotridecyl alcohol, oleyl alcohol, Guerbet alcohols containing 8 to 20 carbon atoms, linoleyl alcohol, lauryl alcohol, stearyl alcohol, cyclohexanol and benzyl alcohol, preferably from the group consisting of butyltriglycol, 2-ethylhexanol and methoxy polyethylene glycol.

Guerbet alcohols are represented by the general formula (X),

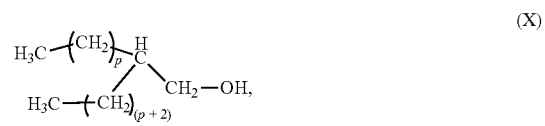

wherein p is 1, 2, 3 or 4.

The trivial name of Guerbet alcohol is used for 2-alkyl-substituted 1-alkanols whose industrial synthesis is described inter alia in H. Machemer, Angewandte Chemie, Vol. 64, pages 213-220 (1952) and in G. Dieckelmann and H. J. Heinz in "The Basics of Industrial Oleochemistry", pages 145-145 (1988).

In an embodiment the Guerbet alcohol is selected from 2-ethylhexanol, 2-propyl-heptanol, 2-butyl-1-octanol and 2-pentyl-1-nonanol.

In an embodiment according to the presently claimed invention, the at least one monohydroxyl compound of general formula (I) in step (ii) is added during a time period in the range of ≥3 hours to ≤50 hours, preferably in the range of ≥3 hours to ≤30 hours, and more preferably in the range of ≥3 hours to ≤20 hours.

In an embodiment according to the presently claimed invention, in step ii) the temperature is in the range of ≥20° C. to ≤60° C., preferably in the range of ≥25° C. to ≤55° C., and more preferably in the range of ≥30° C. to ≥50° C.

In an embodiment according to the presently claimed invention, in step (ii) optionally a solvent is added. The solvent used should be essentially inert to the reaction. While it may not be necessary to employ the solvent during formation of the urethane prepolymer, the use of a solvent may be desirable to maintain the reactants in the liquid state as well as permit better temperature control during the reaction by serving as a heat sink and, if desired, as a refluxing medium. In any event, the pre-polymer is in solution during its reaction with diamine to form the urea-urethane. Exemplary of other solvents which do not contain reactive hydrogen are esters, ethers, ketoesters, ketones, glycol-ether-esters, chlorinated hydrocarbons, aliphatic and alicyclic hydrocarbons, pyrrolidones, hydrogenated furans, and the like and mixtures thereof.

In an preferred embodiment according to the presently claimed invention, the optional solvent is selected from the group consisting of acetone, benzene, ethyl acetate, butyl acetate, diethylether, carbon tetrachloride and chlorobenzene.

In an embodiment according to the presently claimed invention, the weight ratio of toluene diisocyanate to the optional solvent is in the range of ≥0.5:1.0 to ≤5.0:1.0, preferably in the range of ≥1.0:1.0 to ≤4.5:1.0, more preferably in the range of ≥1.5:1.0 to ≤4.0:1.0, more preferably in the range of ≥2.0:1.0 to ≤3.5:1.0, and most preferably in the range of ≥2.5:1.0 to ≤3.0:1.0.

In an embodiment according to the presently claimed invention, the at least one diamine is selected from the group consisting of 4,4-diamino-diphenylmethane, 3,3-dimethyl-4,4-diamino-diphenylmethane, 2,2-bis(4-aminocyclohexyl)- propane, N,N-dimethyl-4,4-diaminodiphenylmethane, (3-methyl-4-aminocylcohexyl)-(3-methyl-4-aminophenyl)-methane, 4, 4 diaminodicyclohexylmethane, isomeric xylylenediamine, ethylenediamine, hexamethylenediamine, 4,4-methylenebis(cyclohexylamine), 1,12-diaminododecane, neopentanedimaine, 1,2- and 1,3-propanediamine, 1, 8-octamethylenediamine and 1, 12-dodecamethylenediamine.

In an embodiment according to the presently claimed invention, the at least one polar aprotic solvent is selected from the group consisting of dimethyl sulfoxide, N, N-dimethylformamide, N, N-dimethylacetamide, N-methylpyrrolidone, N-ethylpyrrolidone, N-propylpyrrolidone, N-butylpyrrolidone, or comparable alkyl pyrrolidone or mixtures thereof, N,N,N',N'-tetramethylurea, acetonitrile, acetone and hexamethyl-phosphoric acid triamide.

In an embodiment according to the presently claimed invention, the lithium salt is selected from the group consisting of lithium chloride, lithium nitrate and lithium bromide.

In an embodiment according to the presently claimed invention, the lithium salt is present in the range of ≥0.3 to ≤1.5 mol, relative to the equivalent weight of the at least one diamine, preferably in the range of ≥0.5 to 1.0≤mol.

In an embodiment according to the presently claimed invention, in step iv) the temperature is in the range of ≥30° C. to ≤100° C., preferably in the range of ≥40° C. to ≤80° C., and more preferably in the range of ≥40° C. to ≤60° C.

In an embodiment according to the presently claimed invention, the solvent added in step ii) is removed at the end of step iv).

In an embodiment according to the presently claimed invention, the urea urethane obtained has a weight average molecular weight in the range of ≥500 g/mol to ≤3000 g/mol determined according to DIN 55672-1, preferably in the range of ≥700 g/mol to ≤3000 g/mol, more preferably in the range of ≥1000 g/mol to ≤2500 g/mol, and even more preferably in the range of ≥1500 g/mol to ≤2500 g/mol.

In an embodiment according to the presently claimed invention, in step (ii), the NCO content via titration is lower than 110%, preferably lower than 105%, of the "theoretical NCO content". The "theoretical NCO content" here is theoretically calculated based on only half amount of the NCO groups from TDI raw material reacted with R—OH. In an embodiment according to the presently claimed invention, in step (iv), the NCO content is preferably 0%.

In an embodiment, the presently claimed invention provides a process for preparing a urea urethane comprising:
i) introducing toluene diisocyanate into a reactor;
ii) adding at least one monohydroxyl compound of general formula (I)

R—OH (I), wherein R is linear or branched alkyl containing 4 to 22 carbon atoms, linear or branched alkenyl containing 4 to 22 carbon atoms, cycloalkyl containing 6 to 12 carbon atoms, aralkyl containing 7 to 12 carbon atoms, a radical of formula $C_mH_{2m+1}(O—C_nH_{2n})_x$—, a radical of formula $H(O—C_nH_{2n})_x$—, a radical of formula $C_mH_{2m+1}[O—C(=O)—C_vH_{2v}]_x$—, or a radical of formula $C_mH_{2m+1}(O—C_nH_{2n})_{x-1}[O—C(=O)—C_vH_{2v}]_x$—, wherein m is an integer from 1 to 22, n is an integer from 2 to 4, x is an integer from 1 to 15 and v is an integer from 4 to 6, to obtain at least one monoisocyanate adduct, wherein, the at least one monohydroxyl compound of general formula (I) in step (ii) is added during a time period in the range of ≥3 hours to ≤50 hours,
wherein the temperature is in the range of ≥20° C. to ≤60° C., and
whereby the molar ratio of the at least one monohydroxyl compound of general formula (I) to the toluene diisocyanate is in the range of >1.0:1.0 to ≤1.5:1.0;
iii) preparing a pre-mix by mixing at least one diamine, at least one polar aprotic solvent, and at least one lithium salt; and
iv) feeding the pre-mix obtained in step iii) into the reactor to react with the at least one monoisocyanate adduct obtained in step ii) to obtain the urea urethane, wherein the temperature is in the range of ≥30° C. to ≤100° C.

In another preferred embodiment, the presently claimed invention provides a process for preparing a urea urethane comprising:
i) introducing toluene diisocyanate into a reactor;
ii) adding at least one monohydroxyl compound selected from the group consisting of butyltriglycol, methoxy polyethylene glycol, butanol, isotridecyl alcohol, oleyl alcohol, Guerbet alcohols containing 8 to 20 carbon atoms, linoleyl alcohol, lauryl alcohol, stearyl alcohol, cyclohexanol and benzyl alcohol,
wherein, the at least one monohydroxyl compound of general formula (I) in step (ii) is added during a time period in the range of ≥3 hours to ≤50 hours,
wherein the temperature is in the range of ≥20° C. to ≤60° C., and
whereby the molar ratio of the at least one monohydroxyl compound of general formula (I) to the toluene diisocyanate is in the range of >1.0:1.0 to ≤1.5:1.0;
iii) preparing a pre-mix by mixing at least one diamine selected from the group consisting of amines of general formula (II), $H_2N—R'—NH_2$ (II), wherein R' is $—C_yH_{2y}$, and y is an integer from 2 to 12,

amines of general formula (III),

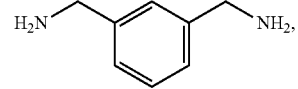 (III)

amines of general formula (IV), and

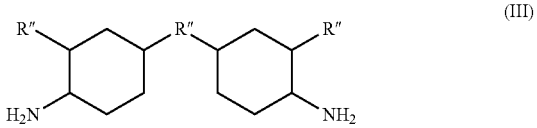 (IV)

amines of general formula (V),

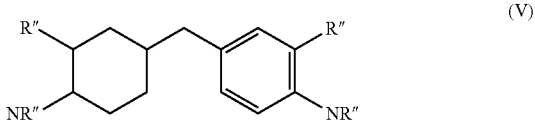

wherein R'', identical or different, is $CH_3$— or H,
at least one polar aprotic solvent, and at least one lithium salt; and
iv) feeding the pre-mix obtained in step iii) into the reactor to react with the at least one monoisocyanate adduct obtained in step ii) to obtain the urea urethane, wherein the temperature is in the range of ≥30° C. to ≤100° C.

In an embodiment, the presently claimed invention provides, a process for preparing a urea urethane comprising:
i) introducing toluene diisocyanate into a reactor;
ii) adding at least one monohydroxyl compound of general formula (I)

wherein R is linear or branched alkyl containing 4 to 22 carbon atoms, linear or branched alkenyl containing 4 to 22 carbon atoms, cycloalkyl containing 6 to 12 carbon atoms, aralkyl containing 7 to 12 carbon atoms, a radical of formula $C_mH_{2m+1}(O—C_nH_{2n})_x$—, a radical of formula $H(O—C_nH_{2n})_x$—, a radical of formula $C_mH_{2m+1}[O—C(=O)—C_vH_{2v}]_x$—, or a radical of formula $C_mH_{2m+1}(O—C_nH_{2n})_{x-1}[O—C(=O)—C_vH_{2v}]_x$—, wherein m is an integer from 1 to 22, n is an integer from 2 to 4, x is an integer from 1 to 15 and v is an integer from 4 to 6, to obtain at least one monoisocyanate adduct,
wherein the toluene diisocyanate is an isomeric mixture comprising ≥85.0 wt.-% to ≤99.9 wt.-% of the 2,4-isomer,
wherein, the at least one monohydroxyl compound of general formula (I) in step (ii) is added during a time period in the range of ≥3 hours to ≤50 hours,
wherein the temperature is in the range of ≥20° C. to ≤60° C.,
whereby the molar ratio of the at least one monohydroxyl compound of general formula (I) to the toluene diisocyanate is in the range of >1.0:1.0 to ≤1.5:1.0; and
wherein optionally a solvent is added;
iii) preparing a pre-mix by mixing at least one diamine, at least one polar aprotic solvent, and at least one lithium salt; and
iv) feeding the pre-mix obtained in step iii) into the reactor to react with the at least one monoisocyanate adduct obtained in step ii) to obtain the urea urethane, wherein the temperature is in the range of ≥30° C. to ≤100° C., and wherein the solvent added in step (ii) is removed.

In an embodiment the presently claimed invention provides a liquid composition comprising ≥0.01 wt.-% to ≤10.0 wt.-%, based on the total weight of the liquid composition, of the urea urethane obtained according to the process of the present invention, preferably in the range from ≥0.1 wt.-% to 7.0≤wt.-%, more preferably in the range from ≥0.1 wt.-% to ≤5.0 wt.-%, even more preferably in the range from ≥0.1 wt.-% to ≤3.0 wt.-%; and ≥15.0 wt.-% to 99.9≤wt.-%, preferably ≥25.0 wt.-% to 90.0≤wt.-%, more preferably ≥35.0 wt.-% to 85.0≤wt.-%, even more preferably ≥50.0 wt.-% to ≤80.0 wt.-%, and most preferably ≥55.0 wt.-% to ≤75.0 wt.-% based on the total weight of the liquid composition of at least one of the components, selected from the group consisting of pigment pastes, binders, fillers, solvents, defoamers, neutralising agent, wetting agent, pigment dispersing agents, preservatives and water.

In an embodiment according to the presently claimed invention, the composition is a water based or a solvent based paint and coating formulations, lacquer, varnish, paper coating, wood coating, adhesive, ink, cosmetic formulation, detergent formulation, textile and drilling muds plaster formulations, cement compositions, formulations for plasterboard, for hydraulic binders such as mortar formulations, formulations for ceramics and for leather, preferably water based and solvent based paint and coating formulations, adhesives, inks and cementitious formulations.

In an embodiment the presently claimed invention provides a use of the urea urethane obtained according to the process of the present invention in liquid compositions as a thixotropic agent for paint and coating formulations, adhesive, paint lacquer, PVC plastisol, ink and cement formulations, preferably for water based and solvent based paint and coating formulations, adhesives, inks and cementitious formulations.

In a preferred embodiment the liquid composition is a water based or solvent based paint and coating formulation. Paints and coating compositions for the purposes of the invention are those, which are applied from liquid phase to a substrate and, with the formation of a film, form a protective or functional and/or decorative surface. By substrates are meant, for example, wood, metals, polymeric films, polymeric parts, paper, leather, fingernails and toenails, and construction materials, such as masonry, concrete and plasters, for example. The coating materials in question may be unpigmented, pigmented or dye-containing coating materials, which may in turn contain different kinds of binders, alone or in a mixture, along with other additives such as filler, binders, neutralizing agents, pigments, defoamers, wetting agents, pigment dispersing agents etc. A few examples of the additives used in the coating formulations are:

Fillers

Suitable fillers are, for example, organic or inorganic particulate materials such as, for example, calcium carbonates and silicates, and also inorganic fiber materials such as glass fibers, for example. Organic fillers as well, such as carbon fibers, and mixtures of organic and inorganic fillers, such as mixtures of glass fibers and carbon fibers or mixtures of carbon fibers and inorganic fillers, for example, may find application.

Binders

Suitable binders are the ones customarily used, for example the ones described in 30 Ullmann's Encyclopedia of Industrial Chemistry, 5th Edition, Vol. A18, pp. 368-426, VCH, Weinheim 1991, Germany. In general, the film-forming binder is based on a thermoplastic or thermosetting resin. Examples thereof are alkyd, acrylic, unsaturated or saturated polyester resin, acrylate and methacrylate resins, nitrocellulose, cellulose acetobutyrate, alkyd-amino resins, alkyd resins, melamine resins, urea resins, silicone resins, phenolic, melamine, epoxy and polyurethane resins and mixtures thereof. Also resins curable by radiation or air-drying 35 resins can be used. Binders may also be derived from polyvinylalcohol and polyvinylbutyral. Binders include latex polymers made by emulsion polymerization. For architectural coatings especially preferred latex polymers are based on acrylic emulsion polymers, styreneacrylic emulsion polymers, vinyl acetate-acrylic emulsion polymers or emulsion polymers based on ethylene and vinyl acetate.

Pigments

Organic or inorganic pigments are suitable as additives. Examples of organic pigments are color pigments and mother-of-pearl-like pigments such as azo, disazo, naphthol, benzimidazolone, azo condensation, metal complex, isoindolinone, quinophthalone, and dioxazine pigments, polycyclic pigments such as indigo, thioindigo, quinacridones, phthalocyanines, perylenes, perinones, anthraquinones, e.g., aminoanthraquinones or hydroxyanthraquinones, anthrapyrimidines, indanthrones, flavanthrones, pyranthrones, anthanthrones, isoviolanthrones, diketo-pyrrolopyrroles, and also carbazoles, e.g., carbazole violet, and the like. Other examples of organic pigments can be found in the following monograph: W. Herbst, K. Hunger, "Industrielle Organische Pigmente", $2^{nd}$ edition, 1995, VCH Verlagsgesellschaft, ISBN: 3-527-28744-2. Examples of inorganic pigments are titanium dioxide, metallic flakes, such as aluminum and also aluminum oxide, iron (Ill) oxide, chromium (Ill) oxide, titanium (IV) oxide, zirconium(IV)oxide, zinc oxide, zinc sulfide, zinc phosphate, mixed metal oxide phosphates, molybdenum sulfide, cadmium sulfide, graphite, vanadates such as bismuth vanadate, chromates, such as lead(IV) chromates, molybdates such as lead(IV) molybdate, and mixtures thereof.

Neutralizing Agent

Suitable neutralizing agents are inorganic bases, organic bases, and combinations thereof. Examples of inorganic bases include but are not limited to the alkali metal hydroxides (especially lithium, sodium, potassium, magnesium, and ammonium), and alkali metal salts of inorganic acids, such as sodium borate (borax), sodium phosphate, sodium pyrophosphate, and the like; and mixtures thereof. Examples of organic bases include but are not limited to triethanolamine (TEA), diisopropanolamine, triisopropanolamine, aminomethyl propanol (2-Amino-2-methyl-1-propanol), dodecylamine, cocamine, oleamine, morpholine, triamylamine, triethylamine, tetrakis(hydroxypropyl)ethylenediamine, L-arginine, methyl glucamine, isopropylamine, aminomethyl propanol, tromethamine (2-amino 2-hydroxymethyl-1,3-propanediol), and PEG-15 cocamine. Alternatively, other alkaline materials can be used alone or in combination with the above-mentioned inorganic and organic bases.

Defoamers

Suitable defoamers are selected from the wide range of defoamer used such as silicone based defoamers, emulsion defoamers, star polymer based defoamers, powder defoamers, oil based defoamers.

The process of the presently claimed invention offers one or more of the following advantages:
1. Simple and economical process as no diisocyanate distillation step is required.
2. The process provides a stable urea urethane polymer which upon use as an additive in paint and coating formulations imparts thixotropic effects to said formulations.

Having generally described the invention, a further understanding can be obtained by reference to certain specific examples which are provided herein for the purpose of illustration only, and are not intended to be limiting unless otherwise specified.

EXAMPLES

Compounds

Lupranat T® 80A, also referred to as "TDI T 80" is an isomer mixture of 80 wt.-% 2,4- and 20% 2,6-toluene diisocyanate (TDI);

Butyl trigylcol, mixtures of ethylene glycol monoalkyl ethers; and

Joncryl® 507, hydroxyl functional acrylic polymer,
are available from BASF SE, Ludwigshafen, Germany.

Desmodur® T 100SP, also referred to as "TDI T 100" is a pure 2,4'-toluene diisocyanate (TDI) which is available from Covestro.

Epikote™ Resin 1001-X-75, a 75% solids solution in xylene based on epichlorohydrin and bisphenol A, is available from Hexion.

Macrynal SM 510, a hydroxyl-containing (meth)acrylic copolymer, is available from Hoechst-Vianova Resins.

BYK® 300, a solution of polyether modified dimethylpolysiloxane is available from BYK (Altana group).

m-xylylene diamine (m-XDA);
Hexamethylene diamine;
4,4'-methylenebis(cyclohexylamine);
2-ethylhexanol;
Methoxy polyethylene glycol 350 (MPEG 350);
Dimethyl sulfoxide (DMSO);
Ethyl acetate (EtOAc);
Lithium nitrate ($LiNO_3$);
Lithium chloride (LiCl);
Butyl acetate;
Butyl glycol acetate;
Methyl isobutyl ketone;
iso-butanol;
Lithium bromide (LiBr);
N-ethyl-2-pyrrolidone (NEP); and
N-methyl-2-pyrrolidone (NMP),
are available from Sigma-Aldrich.

Methods

Viscosity

The reported viscosities are obtained either by a rheometer according to a method in dependence to DIN 53019 or calculated from values of a brabender plastograph.

Theoretical NCO Content

Theoretical NCO content is calculated as follows:

Theoretical $NCO$ content=$0.2411*M_{TDI}/(M_{TDI}+M_{R-OH}+M_{solvent})*100\%$ $M_{TDI}$: Weight of TDI charged in
$M_{R-OH}$: weight of R—OH charged in
$M_{solvent}$: weight of solvent(optional) charged in Molecular Weight The reported molecular weight is obtained according to a method in dependence to DIN 55672-1.

Preparation of Toluene Diisocyanate (TDI)

Blends of Desmodur® T100SP (pure 2,4-toluene diisocyanate) and Lupranat® T 80A (an isomeric mixture of 80.0 wt.-% 2,4- and 20.0 wt.-% 2,6-toluene diisocyanate) are used to prepare TDI examples to be used in the process according to the presently claimed invention. For example, T98 is a blend of Desmodur® T100SP and Lupranat® T 80A with the ratio of 90:10, and T90 is a blend of Desmodur® T100 SP and Lupranat® T 80A with the ratio of 50:50.

Preparation of Urea Urethane Polymer

Standard procedures for preparing urea urethane polymers are known in art. In one such procedure, the urea urethane polymer is synthesized in a two-step procedure. In the first step, a monohydroxyl compound is reacted in the presence of diisocyanate to synthesize a monoisocyanate adduct; and in the second step, the monoisocyanate adduct is reacted with a diamine in the presence of a Lithium salt and a carrier solvent.

Process for preparing the urea urethane polymer according to the present invention has been provided in the following non-limiting examples.

Example 1

In a 5-necked 200 ml Sulfier flask with an overhead stirrer, thermometer, reflux condenser and septum, 17.4 g of TDI T 100 (100 mmol) and 10 g of "solvent A", for example, ethyl acetate was purged with nitrogen. 21.6 g of "alcohol" (monohydroxyl compound R—OH), for example, butyl triglycol (BTG) (105 mmol) was fed to the reactor over a time period of 3 hours at a temperature "T 1" for example, at 45° C. The molar ratio of monohydroxyl compound R—OH to TDI is 1.05:1. The reaction was exothermic and the internal temperature was kept lower than 50° C. After the completion of the feed, the reaction was continued until the NCO value (NCO %) of 8.6% was reached. 2.6 g lithium nitrate, 6.2 g of "diamine", for example, m-xylylene diamine (m-XDA) (46 mmol) and 48 g of "solvent B*", for example, dimethyl sulfoxide (DMSO), were mixed at room temperature. The resulting mixture was fed into the monoisocyanate adduct obtained at a temperature "T 2", for example, at 60° C. The reaction was exothermic and the internal temperature was kept lower than 80° C. The resulting mixture was heated to a temperature of 80° C. and held until the NCO value is 0%. Then "solvent A", i.e. ethyl acetate was distilled out under vacuum. The resulting urea urethane polymer (product) was a yellowish transparent liquid and was free flowing at room temperature. The product remained stable (no precipitation or gel formation) upon storage (>2 months) under ambient conditions.

\* "Solvent B" is a polar aprotic solvent

Examples 2 to 29

Examples 2 to 29 were prepared in a manner similar to example 1 with variations in amounts and examples of TDI, solvent A, alcohol, diamine, solvent B and other process parameters such as temperatures T1 and T2, and NCO %. Table 2 provides details of the representative examples 2 to 29 according to the process of the presently claimed invention.

TABLE 1

| Example | TDI (in g) | TDI isomers (in wt.-%) | Solvent A (in g) | Alcohol (in g) | T1 (in ° C.) | NCO (in %) | Diamine (in g) | Solvent B (in g) | T2 (in ° C.) |
|---|---|---|---|---|---|---|---|---|---|
| 2 | (17.4) | 2,4 isomer: 100<br>2,6 isomer: 0 | EtOAc (10) | BTG (22.6) | 45 | 8.6 | m-XDA (6.2) | DMSO (49) | 60 |
| 3 | (17.4) | 2,4 isomer: 98<br>2,6 isomer: 2 | EtOAc (10) | BTG (21.6) | 45 | 8.6 | m-XDA (6.2) | DMSO (48) | 60 |
| 4 | (17.4) | 2,4 isomer- 96<br>2,6 isomer- 4 | EtOAc (10) | BTG (21.6) | 45 | 8.6 | m-XDA (6.2) | DMSO (48) | 60 |
| 5 | (17.4) | 2,4 isomer: 96<br>2,6 isomer: 4 | EtOAc (10) | BTG (22.6) | 45 | 8.6 | m-XDA (6.2) | DMSO (49) | 60 |
| 6 | (17.4) | 2,4 isomer: 96<br>2,6 isomer: 4 | EtOAc (10) | BTG (21.6) | 55 | 8.6 | m-XDA (6.2) | DMSO (48) | 60 |
| 7 | (17.4) | 2,4 isomer: 94<br>2,6 isomer: 6 | EtOAc (10) | BTG (21.6) | 45 | 8.6 | m-XDA (6.2) | DMSO (48) | 60 |
| 8 | (17.4) | 2,4 isomer: 94<br>2,6 isomer: 6 | EtOAc (10) | BTG (21.6) | 45 | 9.0 | m-XDA (6.2) | DMSO (48) | 60 |
| 9 | (17.4) | 2,4 isomer: 94<br>2,6 isomer: 6 | EtOAc (10) | BTG (21.6) | 45 | 9.6 | m-XDA (6.2) | DMSO (48) | 60 |
| 10 | (17.4) | 2,4 isomer: 94<br>2,6 isomer: 6 | EtOAc (10) | BTG (21.6) | 55 | 8.6 | m-XDA (6.2) | DMSO (48) | 60 |
| 11 | (17.4) | 2,4 isomer: 94<br>2,6 isomer: 6 | EtOAc 10) | BTG (21.6) | 45 | 8.6 | m-XDA (6.2) | DMSO (48) | 80 |
| 12 | (17.4) | 2,4 isomer: 94<br>2,6 isomer: 6 | EtOAc (10) | BTG (21.6) | 45 | 8.6 | m-XDA (6-8) | DMSO 48) | 60 |
| 13 | (17.4) | 2,4 isomer: 94<br>2,6 isomer: 6 | EtOAc (10) | BTG (21.6) | 30 | 8.6 | m-XDA (6.2) | DMSO (48) | 60 |
| 14 | (17.4) | 2,4 isomer: 94<br>2,6 isomer: 6 | — | BTG (21.6) | 45 | 10.9 | m-XDA (6.2) | DMSO (48) | 60 |
| 15 | (17.4) | 2,4 isomer: 92<br>2,6 isomer: 8 | EtOAc (10) | BTG (21.6) | 45 | 8.6 | m-XDA (6.2) | DMSO (48) | 60 |
| 16 | (17.4) | 2,4 isomer: 90<br>2,6 isomer: 10 | EtOAc (10) | BTG (21.6) | 45 | 8.6 | m-XDA (6.2) | DMSO (48) | 60 |
| 17 | (17.4) | 2,4 isomer: 88<br>2,6 isomer: 12 | EtOAc (10) | BTG (21.6) | 45 | 8.6 | m-XDA 6.2) | DMSO 48) | 60 |
| 18 | (17.4) | 2,4 isomer: 85<br>2,6 isomer: 15 | EtOAc (10) | BTG (21.6) | 45 | 11 | m-XDA (6.2) | DMSO (48) | 60 |
| 19 | (17.4) | 2,4 isomer: 94<br>2,6 isomer: 6 | EtOAc (10) | BTG (21.6) | 45 | 8.6 | m-XDA (6.2) | NMP (48) | 60 |
| 20 | (17.4) | 2,4 isomer: 94<br>2,6 isomer: 6 | — | BTG (21.6) | 45 | 10.9 | m-XDA (6.2) | NMP (48) | 60 |
| 21 | (17.4) | 2,4 isomer: 94<br>2,6 isomer: 6 | EtOAc (10) | BTG (21.6) | 45 | 8.6 | m-XDA (6.2) | DMF (48) | 60 |
| 22 | (17.4) | 2,4 isomer: 94<br>2,6 isomer: 6 | — | BTG (21.6) | 45 | 10.9 | m-XDA (6.2) | NEP (48) | 60 |
| 23 | (17.4) | 2,4 isomer: 94<br>2,6 isomer: 6 | EtOAc (10) | BTG (21.6) | 45 | 8.6 | hexamethylene diamine, (5.3) | DMSO (47) | 60 |

TABLE 1-continued

| Example | TDI (in g) | TDI isomers (in wt.-%) | Solvent A (in g) | Alcohol (in g) | T1 (in ° C.) | NCO (in %) | Diamine (in g) | Solvent B (in g) | T2 (in ° C.) |
|---|---|---|---|---|---|---|---|---|---|
| 24 | (17.4) | 2,4 isomer: 94 2,6 isomer: 6 | EtOAc (10) | BTG (21.6) | 45 | 8.6 | 4,4'-methylenebis(cyclohexylamine) (9.6) | DMSO (51) | 60 |
| 25 | (17.4) | 2,4 isomer: 94 2,6 isomer: 6 | EtOAc (10) | 2-Ethylhexanol (13.6) | 45 | 10.3 | m-XDA (6.2) | DMSO (40) | 60 |
| 26 | (17.4) | 2,4 isomer: 94 2,6 isomer: 6 | EtOAc (10) | MPEG 350 (36.7) | 45 | 6.6 | m-XDA (6.2) | DMSO (62) | 60 |
| 27 | similar to example 4 but with 1.6 g of LiCl and 47 g of DMSO ||||||||| |
| 28 | similar to example 8 but with 3.2 g of LiBr and 49 g of NMP ||||||||| |
| 29 | Similar to example 9 but with 3.0 g of LiCl ||||||||| |

Comparative Example 1

In a comparative example, urea urethane polymer was obtained by using TDI T100 (pure 2, 4'-toluene diisocyanate), with no excess "monohydroxyl compound R—OH", without "solvent A" and the reaction was carried out at the room temperature. Details of the process are as follows—in a 5-necked 200 ml Sulfier flask with an overhead stirrer, thermometer, reflux condenser and septum, 17.4 g of TDI T100 (100 mmol) was purged with nitrogen. 20.5 g of butyl triglycol (100 mmol) was fed to the reactor over 3 hours at room temperature. The reaction was exothermic and the internal temperature was kept lower than 45° C. After the completion of the feed, the reaction was continued until the theoretical NCO value reached to 11%. 1.6 g lithium chloride, 6.8 g of m-xylylene diamine (mXDA, 50 mmol) and 46 g of dimethyl sulfoxide (DMSO) were mixed at room temperature. The resulting mixture was fed into the monoisocyanate adduct obtained at the room temperature. The reaction was exothermic and the internal temperature was kept lower than 80° C. The resulting mixture was heated to 80° C. and held until the NCO value reached 0%. The resulting urea urethane polymer (product) was a yellow turbid liquid which was free flowing at room temperature, but it was not stable upon storage (>1 month) under ambient conditions, i.e. gel formation occurred.

Comparative Example 2

In a comparative example, urea urethane polymer was obtained by using TDI T80 (an isomer mixture of 80 wt.-% 2,4- and 20 wt.-% 2,6-toluene diisocyanate), with no excess "monohydroxyl compound R—OH", without "solvent A" and the reaction was carried out at the room temperature. The same process as comparative example 1 was followed but with TDI T80 (instead of TDI T100 of comparative example 1). The reaction could not be processed homogenously because of the gel formation during the diamine dosing.

Storage Stability of the Urea Urethane Polymer

The storage stability of the urea urethane polymer according to the present invention (examples 1 to 29) was studied over a period of greater than 1 month and compared with the storage stability of comparative examples 1 and 2. The urea urethane polymer (product) was ranked on a scale of 1 to 4, 1 being the best and 4 being the worst, based upon the particulars provided in table 2. The urea urethane polymer (product) with a ranking 1 to 3 is considered acceptable for use as an additive in coating formulations.

TABLE 2

| Ranking | Particulars |
|---|---|
| 1 | The product is a yellowish transparent liquid, is free flowing at room temperature and remains stable (no precipitation or gel formation) upon storage (>2 months) under ambient conditions |
| 2 | The product is a yellowish turbid liquid and is free flowing at room temperature, but it is not stable upon storage (>1 month) under ambient conditions, i.e. gel/precipitation formation occurs |
| 3 | The reaction runs homogenously, but the product is a turbid gel |
| 4 | The reaction cannot be processed homogenously because of the gel formation during the diamine dosing |

The results of the storage stability studies are provided in table 3 below.

TABLE 3

| Example No.s | Ranking |
|---|---|
| 1, 2, 3, 4, 5, 7, 8, 12, 13, 14, 19, 20, 21, 22, 23, 24, 25, 26, 27, 28, 29 | 1 |
| 6, 9, 10, 11, 15, comparative example 1 | 2 |
| 16, 17, 18 | 3 |
| comparative example 2 | 4 |

Measurement of Thickening Effect

To demonstrate the thickening effect of the urea urethane polymer (additive) obtained according to the process of the present invention a few representative examples, i.e. 1, 3, 4, 7, 14, 16, 18, 28, and 29, and comparative example 1 were tested by adding 0.5% (on product form) of the additive into the OH-component of a 2K polyurethane coating formulation 1, the composition of which is provided in table 4.

TABLE 4

| Formulation 1 | |
|---|---|
| Compounds | Wt.-% |
| Jonacryl ® 507 resin | 78 |
| butyl acetate | 19 |
| additive | 3 |
| total | 100 |

The mixture was shaken by hand for 30 seconds and then kept on standby. The thickening effect was determined by the time (t 1; in minutes) of this mixture to form a non-flowing gel. The short time to form the gel means better thickening effect. Table 5 provides the values of t 1 which provides the time taken by from stop the shaking to form the gel.

TABLE 5

| Example | t 1 (in minutes) |
|---|---|
| Control | +∞ |
| 1 | 150 |
| 3 | 30 |
| 4 | 15 |
| 7 | 5 |
| 14 | 6 |
| 16 | 5 |
| 18 | 3 |
| 28 | 7 |
| 29 | 30 |
| Comparative example 1 | 300 |

As is evident from table 5, the coating formulation comprising the urea urethane polymer (additive) prepared according to the process of the present invention, i.e. examples 1, 3, 4, 7, 14, 16, 18, 28, 29 took lesser time to gel as compared to the comparative example 1, thereby demonstrating better thickening properties of the additive obtained according to the presently claimed invention over the comparative example 1.

Thixotropy Measurement

The thixotropy was determined via shear jump measurement in coating formulation 2 and formulation 3.

Compounds of formulation 2 are provided in table 6 below.

TABLE 6

| Formulation 2 | |
|---|---|
| Compounds | Wt.-% |
| Epikote ™ Resin 1001-X-75 | 74.7 |
| methylisobutyl ketone | 17.1 |
| isobutanol | 7.4 |
| additive | 0.8 |
| total | 100 |

The coating solution (formulation 2) was stirred via Dispermat for 5 min @ 2000 rpm, and then kept at standby overnight at room temperature before measuring the viscosity. The urea urethane polymer (additive) prepared according to the process of the present invention was added to the formulation 2 to study the thixotropic effect of the additive on the coating formulation 2. Formulation 2 without the additive, i.e. control was treated as a reference. The measurement starts with the shear rate of $0.05\ s^{-1}$ for 200 seconds, and then immediately a high shear rate of $250\ s^{-1}$ for 60 seconds was applied and, immediately thereafter, the shear rate was reduced to $0.05\ s^{-1}$ for 200 seconds. To study the thixotropic effect of the urea urethane polymer (additive) according to the present invention upon addition to the formulation 2, viscosity of formulation 2 was measured at the following intervals— i) Viscosity at t=199 sec, immediately before the high shear is applied ii) Viscosity t=201 sec, immediately after high shear is applied iii) Viscosity at t=259 sec, immediately after high shear is removed iv) Viscosity t=450 sec, well after high shear is removed The viscosity measurements at different time intervals are provided in table 7.

TABLE 7

| | Viscosity (in mpa · s) | | | |
|---|---|---|---|---|
| Example | t = 199 | t = 201 | t = 259 | t = 450 |
| Control (no additive) | 200 | 190 | 200 | 200 |
| 1 | 1800 | 200 | 210 | 210 |
| 3 | 2300 | 200 | 220 | 220 |
| 4 | 4050 | 200 | 210 | 290 |
| 7 | 6000 | 210 | 220 | 1000 |
| 14 | 7000 | 210 | 220 | 1050 |
| 16 | 6500 | 220 | 230 | 1040 |
| 18 | 7350 | 230 | 230 | 950 |
| 28 | 6150 | 210 | 220 | 980 |
| 29 | 6500 | 210 | 220 | 400 |

As is evident from the results provided in table 7, the viscosity of formulation 2 (with additive) dropped significantly immediately after high shear (i.e. $250\ s^{-1}$ for 60 seconds) was applied. Immediately after the high shear was removed, an increase in viscosity was observed, and after a significant time has elapsed (ie. t=450 sec) the formulation 2 exhibited a significant recovery of the viscosity. Thus, the urea urethane polymer (additive) prepared according to the process of the present invention upon addition to formulation 2 imparted thixotropic effect to said formulation which is demonstrated by the drop in viscosity immediately after applying shear stress and gradual recovery of viscosity as a function of time upon removal of shear stress. Further, formulation 3 was prepared using compounds as provided in table 8 below.

TABLE 8

| Formulation 3 | |
|---|---|
| Compounds | Wt.-% |
| Macrynal SM 510 | 75 |
| Butylglycol acetate | 8.0 |
| Butyl acetate | 16.4 |
| BYK ® 300 | 0.2 |
| Examples: Additive | 0.4 |
| total | 100 |

The coating solution was prepared and tested as for formulation 2.

The viscosity measurements at different time intervals are provided in table 8.

TABLE 8

| | Viscosity (in mpa · s) | | | |
|---|---|---|---|---|
| Example | t = 199 | t = 201 | t = 259 | t = 450 |
| Control (no additive) | 650 | 640 | 640 | 650 |
| 1 | 30000 | 600 | 720 | 3050 |
| 3 | 28500 | 610 | 710 | 3150 |
| 4 | 31500 | 590 | 700 | 4050 |
| 7 | 30080 | 610 | 1020 | 4700 |
| 14 | 31400 | 650 | 1000 | 4500 |
| 16 | 31500 | 700 | 1050 | 4600 |
| 18 | 31000 | 690 | 950 | 4550 |

TABLE 8-continued

| | Viscosity (in mpa · s) | | | |
|---|---|---|---|---|
| Example | t = 199 | t = 201 | t = 259 | t = 450 |
| 28 | 30100 | 660 | 950 | 4480 |
| 29 | 32000 | 620 | 980 | 4500 |

As is evident from the results provided in table 8, the viscosity of formulation 3 (with additive) dropped significantly immediately after high shear (i.e. 250 s$^{-1}$ for 60 seconds) was applied. Immediately after the high shear was removed, an increase in viscosity was observed, and after a significant time has elapsed (ie. t=450 sec) the formulation 3 exhibited a significant recovery of the viscosity. Thus, all the urea urethane polymer (additive) prepared according to the process of the present invention upon addition to formulation 3 imparted thixotropic effect to said formulation which is demonstrated by the drop in viscosity immediately after applying shear stress and gradual recovery of viscosity as a function of time upon removal of shear stress.

The invention claimed is:

1. A process for preparing a urea urethane, the process comprising:
   i) introducing toluene diisocyanate into a reactor;
   ii) adding at least one monohydroxyl compound of formula (I)

R—OH   (I), wherein R is linear or branched alkyl comprising 4 to 22 carbon atoms, linear or branched alkenyl comprising 4 to 22 carbon atoms, cycloalkyl comprising 6 to 12 carbon atoms, aralkyl comprising 7 to 12 carbon atoms, a radical of formula $C_mH_{2m+1}(O-C_nH_{2n})_x-$, a radical of formula $C_mH_{2m+1}[O-C(=O)-C_vH_{2v}]_x-$, or a radical of formula $C_mH_{2m+1}(O-C_nH_{2n})_{x-1}[O-C(=O)-C_vH_{2v}]_x-$, wherein m is an integer from 1 to 22, n is an integer from 2 to 4, x is an integer from 1 to 15 and v is an integer from 4 to 6,
   to obtain at least one monoisocyanate adduct;
   whereby a molar ratio of the at least one monohydroxyl compound of formula (I) to the toluene diisocyanate is in a range of ≥1.05:1.0 to ≤1.2:1.0;
   iii) preparing a pre-mix by mixing at least one diamine, at least one polar aprotic solvent, and at least one lithium salt; and
   iv) feeding the pre-mix obtained in iii) into the reactor to react with the at least one monoisocyanate adduct obtained in ii), to obtain the urea urethane.

2. The process according to claim 1, wherein the toluene diisocyanate is either 2,4-toluene diisocyanate or an isomeric mixture of 2,4-toluene diisocyanate and 2,6-toluene diisocyanate.

3. The process according to claim 2, wherein 2,4-toluene diisocyanate is present in the isomeric mixture in an amount in a range of ≥85.0 wt.-% to ≤99.9 wt.-%, based on a total weight of the isomeric mixture.

4. The process according to claim 2, wherein 2,4-toluene diisocyanate is present in the isomeric mixture in an amount in a range of ≥90.0 wt.-% to ≤99.9 wt.-%, based on a total weight of the isomeric mixture.

5. The process according to claim 1, wherein m is an integer from 1 to 4.

6. The process according to claim 1, wherein n is 2.

7. The process according to claim 1, wherein x is an integer from 3 to 10.

8. The process according to claim 1, wherein the at least one monohydroxyl compound of formula (I) is selected from the group consisting of butyltriglycol, methoxy polyethylene glycol, butanol, isotridecyl alcohol, oleyl alcohol, a Guerbet alcohol containing 8 to 20 carbon atoms, linoleyl alcohol, lauryl alcohol, stearyl alcohol, cyclohexanol and benzyl alcohol.

9. The process according to claim 1, wherein the molar ratio of the at least one monohydroxyl compound of formula (I) to the toluene diisocyanate is in a range of ≥1.1:1.0 to ≤1.2:1.0.

10. The process according to claim 1, wherein the at least one monohydroxyl compound of formula (I) in (ii) is added during a time period in a range of ≥3 hours to ≤50 hours.

11. The process according to claim 1, wherein, in (ii), a temperature is in a range of ≥20° C. to ≤60° C.

12. The process according to claim 1, wherein the at least one diamine is selected from the group consisting of an amine of formula (II),

H$_2$N—R'—NH$_2$   (II), wherein R' is —C$_y$H$_{2y}$, and y is an integer from 2 to 12,

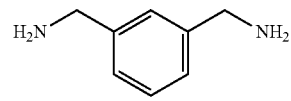

an amine of formula (III),

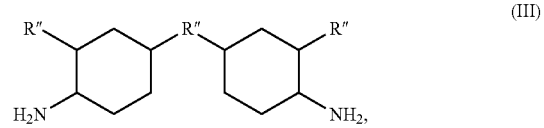

an amine of formula (IV), and

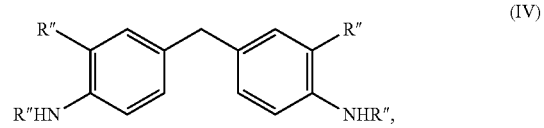

and
an amine of formula (V),

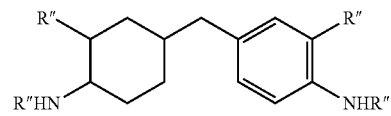

wherein each R" is independently CH$_3$— or H.

13. The process according to claim 1, wherein the at least one diamine is selected from the group consisting of 4,4-diamino-diphenylmethane, 3,3-dimethyl-4,4-diamino-diphenylmethane, 2,2-bis(4-aminocyclohexyl)-propane, N,N-dimethyl-4,4-diaminodiphenylmethane, (3-methyl-4-aminocylcohexyl)-(3-methyl-4-aminophenyl)-methane, isomeric xylylenediamine, ethylenediamine, hexamethylenediamine, 4,4-methylenebis(cyclohexylamine) and 1,12-diaminododecane.

14. The process according to claim 1, wherein the at least one polar aprotic solvent is selected from the group consisting of dimethyl sulfoxide, N,N-dimethylformamide, N,N-dimethylacetamide, N-methylpyrrolidone, N-ethylpyrrolidone, N-propylpyrrolidone, N-butylpyrrolidone, N,N,N', N'-tetramethylurea, and hexamethyl-phosphoric acid triamide.

15. The process according to claim 1, wherein the at least one lithium salt is selected from the group consisting of lithium chloride, lithium nitrate and lithium bromide.

16. The process according to claim 1, wherein the at least one lithium salt is present in a range of $\geq 0.3$ to $\leq 1.5$ mole, relative to an equivalent weight of the at least one diamine.

17. The process according to claim 1, wherein the urea urethane obtained has a weight average molecular weight in a range of $\geq 500$ g/mol to $\leq 3000$ g/mol determined according to DIN 55672-1.

18. The process according to claim 1, wherein the at least one monohydroxyl compound is butyl triglycol.

19. The process according to claim 18, wherein the diamine is m-xylylene diamine.

20. A liquid composition, comprising:
$\geq 0.01$ wt. % to $\leq 10.0$ wt.-%, based on a total weight of the liquid composition, of a urea urethane obtained according to the process of claim 1; and
$\geq 15.0$ wt.-% to $\leq 99.9$ wt.-%, based on the total weight of the liquid composition, of at least one member, selected from the group consisting of a pigment paste, a binder, a filler, a solvent, a defoamer, a neutralising agent, a wetting agent, a pigment dispersing agent, a preservative and water.

21. The liquid composition according to claim 20, wherein the composition is a paint, water based coating formulation, solvent based coating formulation, lacquer, varnish, paper coating, wood coating, adhesive, ink, cosmetic formulation, detergent formulation, textile, or drilling muds plaster formulation, cement composition, plasterboard formulation, hydraulic binder formulation, ceramic formulation or leather formulation.

22. A method of producing a paint or coating formulation, adhesive, paint lacquer, PVC plastisol, or ink or cement formulation, the method comprising obtaining a urea urethane by the process according to claim 1.

* * * * *